United States Patent

Clavaud et al.

[11] Patent Number: 6,080,234
[45] Date of Patent: Jun. 27, 2000

[54] COMPOSITE CONCRETE

[75] Inventors: Bernard Clavaud, Saint-Pierre-de-Chandieu; Gérard Cochet, Vienne; Claudie Gnagne, Lyons; Jean-Pierre Targe, Ecully, all of France

[73] Assignee: Lafarge Materiaux de Specialites, France

[21] Appl. No.: 08/875,688

[22] PCT Filed: Jan. 24, 1996

[86] PCT No.: PCT/FR96/00122

§ 371 Date: Jul. 24, 1997

§ 102(e) Date: Jul. 24, 1997

[87] PCT Pub. No.: WO96/22953

PCT Pub. Date: Aug. 1, 1996

[30] Foreign Application Priority Data

Jan. 25, 1995 [FR] France .................................. 95 01057

[51] Int. Cl.⁷ .......................... C04B 14/06; C04B 14/14; C04B 14/30; C04B 14/38

[52] U.S. Cl. .......................... 106/644; 106/643; 106/640; 106/641; 106/642; 106/711; 106/737; 106/694; 106/695; 106/696; 106/705; 106/706; 106/708; 106/709; 106/710; 106/714; 106/738; 106/817; 106/811

[58] Field of Search .................. 106/640, 641, 106/642, 643, 644, 711, 737, 811, 694, 695, 696, 705, 706, 708, 709, 710, 714, 738, 817

[56] References Cited

U.S. PATENT DOCUMENTS

| 4,229,225 | 10/1980 | Kraszewski et al. ................. 106/643 |
| 4,472,201 | 9/1984 | Ochi et al. ............................... 106/644 |
| 4,780,141 | 10/1988 | Double et al. .......................... 106/644 |
| 5,447,564 | 9/1995 | Xie et al. ................................ 106/644 |
| 5,522,926 | 6/1996 | Richard et al. ........................ 106/643 |
| 5,783,297 | 7/1998 | Wise et al. ............................ 428/304.4 |

FOREIGN PATENT DOCUMENTS

| 0 273 181 | 7/1988 | European Pat. Off. . |
| 0 350 365 | 1/1990 | European Pat. Off. . |
| 0 451 014 | 10/1991 | European Pat. Off. . |
| 2 640 962 | 6/1990 | France . |
| 36 36 644 | 5/1988 | Germany . |
| 95 01317 | 1/1995 | WIPO . |

*Primary Examiner*—Michael Marcheschi
*Attorney, Agent, or Firm*—Millen, White, Zelano & Branigan, P.C.

[57] ABSTRACT

An ultra-high performance composite concrete, with low cement and fiber content and having good mechanical properties as well as good impacts, shocks and projectile protection properties, includes hydraulic binder, aggregates, an admixture of metal fibers. Particularly, the composite concrete includes 70% to 85% of particles (A) having a particle size distribution which ranges from 0.01 to 3 mm up to particle size distribution which ranges from 0.01 to 0.50 mm; 2% to 10% of particles (B) having particle size of between 0.01 and 1 μm; 3% to 20% of hydraulic binder; 0.1 to 3% of a dispersant or plasticizer; 0.05% to 8.5% of fibers; and, mixing water, wherein the percentages being weight percentages based on the sum of the weights of constituents a) to d).

25 Claims, No Drawings

COMPOSITE CONCRETE

The invention relates to a composite concrete with a low cement and fibres content having good mechanical properties, and also possessing good impacts, shocks and projectiles protection properties.

PRIOR ART

In January 1990, the publication of the French Patent Application No. 2,633,922 disclosed a compacted concrete comprising:

a) 7 to 15% by weight of a cement or of a binder for road,
b) 4 to 7% of water,
c) 0.8 to 4% by weight of metal fibres, the balance consisting of
d) 70.7 to 87.8% of granular material with a particle size of from 0 to 31.5 mm,
e) where appropriate, 0.05 to 2% by weight with respect to the cement, of concretes admixtures, and
f) where appropriate, 5 to 20% by weight with respect to the cement, of fly ashes or of ultrafines.

This concrete must be compacted in order to reach its maximum mechanical properties. However, despite the compacting operation, it still has relatively low mechanical properties. This is why it is difficult to find applications for it other than as industrial slabs, roadways, aircraft runways, platforms and roadsides.

In June 1990, French Patent Application No. 2,640,962 proposed a composite concrete comprising, in parts by weight per 100 parts of hydraulic binder:

a hydraulic binder composed of cement (100 parts);
aggregates of high hardness and of particulate geometry, either round or angular (120 to 200 parts);
aggregates of high fineness (40 to 65 parts);
microsilica (3 to 15 parts);
water (25 to 35 parts).

Moreover, this composite concrete having a relatively high cement and fibres content is reputed to be capable of limiting the penetration of projectiles. However, this property is neither demonstrated nor illustrated.

DE-A-3,734,327 describes a structural element capable of withstanding the penetration of projectiles. These elements are produced by means of a composite concrete comprising a hydraulic binder composed of a cement (Z35 to 55:270 to 450 kg/m$^3$), hard additives (basalt, quartz or quartzite, either by themselves or mixed) having a size of at least 4 mm, silica powder (1850 to 1500 kg/m$^3$) and fibres (steel, glass, synthetic, and carbon fibres).

Since this concrete contains no dispersing agent or plasticizer, the mixing-water content is, in a known manner, generally greater than 30% by weight, leading to slight mechanical properties, in particular with regard to the compression strength and flexural strength, and more particularly with regard to the depth of penetration of projectiles which cannot be other than important. These mechanical properties are, however, neither demonstrated nor illustrated in the description.

U.S. Pat. No. 4,472,201 proposes a composite concrete, having good heat stability, for a different field of application, which contains:

from 5 to 70 parts by weight of a mixture comprising:
49.95 to 87.3% by weight of a hydraulic cement,
49.95 to 9.7% by weight of an amorphous silica, and
0.1 to 3% by weight of a dispersing agent,
and from 95 to 30 parts by weight of a refractory aggregate.

This concrete may also include metal fibres, glass fibres, ceramic fibres, carbon fibres, alumina fibres or other types of fibres.

However, this composite concrete contains a large amount of mixing water, leading to slight mechanical properties, in particular for the compression strength and flexural strength, which would lead, ipso facto, to a significant depth of penetration of projectiles in the case of this composition being used for protection.

All the prior art (and especially FR-A-2,633,922) shows that there is a technical prejudice which considers that, compared to conventional cast concretes, only concretes requiring compaction have a lower water content.

There therefore has not existed, until now, a concrete which could be casted or intended to be compacted having both good mechanical properties while still having a low cement, fibres and water content. This concrete would additionally be advantageous if it also possessed good impact, shock and projectile protection properties.

BRIEF DESCRIPTION OF THE INVENTION

The Applicant has therefore managed to fill the gap mentioned above by developing a composite concrete of the type comprising a hydraulic binder, aggregates, an admixture, fibres and mixing water, characterized in that it comprises:

a) from 70 to 85% of particles (A) having a particle size distribution which may range from 0.01 to 3 mm up to 0.01 to 50 mm,
b) from 2 to 10% of particles (B) having a particle size of between 0.01 and 1 $\mu$m, i.e. between $10^{-5}$ and $10^{-3}$ $\mu$m,
c) from 0 to 12% of particles (C) of which at least a majority have a particle size of between 1 and 10 $\mu$m, i.e. between $10^{-3}$ and $10^{-2}$ $\mu$m,
d) from 3 to 20% of hydraulic binder,
e) from 0.1 to 3% of a dispersant or of a plasticizer,
f) from 0.05 to 8.5% of fibres, and
g) from 2 to 4.2% of water, the percentages all being percentages by weight relative to the sum of the weights of constituents a) to e).

This concrete therefore offers at least the following advantages:

a low cement content,
a low fibres content,
simple implementation,
good mechanical properties,
good impacts, shocks or projectiles protection properties.

Further advantages of this concrete will appear on reading the description below.

DETAILED DESCRIPTION OF THE INVENTION

The particles (A) of the concrete according to the invention have a particle size distribution which may range from 0.01 to 3 mm up to 0.01 to 50 mm. These particles are aggregates, granulates or gravels which generally have highly irregular and varied shapes. They may consist, for example, of one or more materials, such as tabular-form alumina, electrofused corundum, natural or calcined bauxite, alumina-based materials sold under the trademark "ALAG", granite, quartzite, diabase, basalt, crystalline quartz, silicon carbides, silicon nitrides, boron carbides, titanium carbides, metals, metal alloys, etc. It is preferred to choose aggregates having a hardness greater than 5 Mohs.

At least a majority of particles (B) have a particle size of between 0.01 and 1 μm. These are fly ashes or various ultra-fine fillers such as silica fumes, microsilicas, kaolinites, calcined clays, limestone fines, chromium oxide, titanium oxide, zirconium oxide, aluminium oxide, etc. They are obtained, for example, by condensation or precipitation.

Preferably, silica fumes such as for example those sold by the Elkem company under the name 971 U, is used as particles (B).

The hydraulic binder is preferably an alumina cement, a mixture of alumina cements, a vitreous cement or a mixture of vitreous cements, a Portland cement whether composed or not (CEM I, CEM II) or a mixture of Portland cements, a cement containing slag or pozzolane.

It is also conceivable to use a mixture of at least one alumina or vitreous cement with at least one Portland cement or a cement containing slag or pozzolanes. However in this case, it is necessary for those skilled in the art to take additional and well-known precautions to maintain workability of concrete and to adjust its setting time. Such precautions may consist, for example in adding a set-retarder, plaster, etc.

The fibre content present in the concrete according to the invention is preferably between 0.05% and 5% by weight.

As dispersing agent or plasticizer, it is possible to use, for example, a hexametaphosphate, a tripolyphosphate, a polynaphthalene sulphonate, a sulphonated polyamine, etc. The mentioned percentages (0.1 to 3%) correspond to the weight of dry matter in relation to the sum of the weights of constituents a) to e).

The concrete according to the invention may also contain particles (C) of which at least a majority have a particle size of between 1 and 10 μm. These are fine fillers preferably in the form of particles having generally spherical geometry. They may be obtained, for example by grinding by means of a ball mill. They may consist, for example of tabular-form alumina, electrofused corundum, natural or calcined bauxite, alumina-based materials sold under the trademark "ALAG", granite, limestone, quartzite, diabase, basalt, ground crystalline quartz, silicon carbides, silicon nitrides, boron carbides, titanium carbides, metals, metal alloys, etc.

The use of particles (C) is preferable when the amount of hydraulic binder employed is low.

The particle (C) content is preferably less than 12% by weight with respect to the sum of the weights of constituents a) to e) and the percentage of fibres is calculated by weight with respect to the sum of the weights of constituents a) to e).

The concrete according to the invention may furthermore contain one or more admixtures of various kinds, such as, for example an anti-foam agent, a water-proofing agent, an air entrainer, a set-accelerator, a set-retarder, a colorant, etc. The admixture(s) content is generally less than 1% by weight with respect to the sum of the weights of constituents a) to e) of the concrete.

The Applicant has discovered that it is desirable for the compactness of the concrete to be at maximum. This may be achieved, for example, by ensuring that the distribution curves (number of particles as a function of their size) of particles (A), of particles (B), of particles constitutive of the hydraulic binder and, where appropriate of particles (C) are continuous or have the continuity maximum, it being understood that the medium does indeed contain the dispersing agent or plasticizer. Thus, the concrete according to the invention contains particles (A) and (B) having the highest possible number of different sizes within the range corresponding to them, namely from 0.01 mm to 50 mm and from 0.01 to 1 μm respectively thereby enabling it to have the maximum compactness and giving it optimum mechanical and penetration resistance properties.

During preparation of the concrete according to the invention, its various constituents are mixed in the presence of water. This water is essential for hydrating the hydraulic binder. The amount of water involved depends on the fluidity and workability which it is desired to obtain for casting the concrete. It is generally between 2 and 5% by weight with respect to the sum of the weights of constituents a) to e) of the concrete. The water is generally introduced before the fibres.

After water and fibre addition, homogenization by mixing or blending and pouring into place, it is advantageous for the concrete to undergo a period of cure, preferably in a humid atmosphere. Next, it is desirable to subject the concrete to an heat treatment under controlled atmosphere. This heat treatment under controlled atmosphere may take place at a temperature of between 80° C. and 600° C., preferably between 110° C. and 350° C. Of course, the heat-treatment under controlled atmosphere temperature is chosen taking into account the nature of the fibres, so as not to damage them.

A concrete is thus obtained which possesses good mechanical properties, although it has been prepared in a relatively simple manner, has a low cement content and has not undergone a compacting operation.

The impact or shock resistance properties are manifested by an ability to resist fracture or shattering under impact or shock.

The projectile resistance properties are manifested by an ability to slow and stop the penetration of this projectile and to resist fracture or shattering under impact of projectile. In other words, a concrete possessing good projectile protection properties is a concrete which has a projectile penetration resistance sufficiently high for the depth of penetration of this projectile to be small and which, furthermore does not break under impact of projectile.

The concrete according to the invention therefore enables to reach important impact, shock or projectile protection even when it is employed in the form of thin slabs, walls or partitions.

It may therefore be employed for providing coatings for protection against small size projectiles, such as bullets fired by firearms, or against large projectiles, such as bombs.

It may also serve for manufacturing personal or collective shelters, whether static or mobile, for the protection of banks, prisons and so-called vital industrial installations, against intrusions or attack which could be committed, in particular using pick hammers or similar tools, or for coating objects which have to be transported and may be dropped while being transported.

After water and fibres addition, homogenization by mixing or blending and pouring into place, it is advantageous for the concrete to undergo a period of cure, preferably in a humid atmosphere. Next, it is desirable to subject the concrete to an heat treatment under controlled atmosphere. This heat treatment under controlled atmosphere may take place at a temperature of between 80° C. and 600° C., preferably between 110° C. and 350° C. Of course, the heat-treatment under controlled atmosphere temperature is chosen taking into account the nature of the fibres, so as not to damage them.

A concrete is thus obtained which possesses good mechanical properties, although it has been prepared in a relatively simple manner, has a low cement content and has not undergone compacting operation.

The impact or shock protection properties are manifested by an ability to resist fracture or shattering under impact or shock.

The projectile protection properties are manifested by an ability to slow and stop penetration of this projectile and to resist fracture or shattering under impact of projectile. In other words, a concrete possessing good projectile protection properties is a concrete which has a projectile penetration resistance sufficiently high for the depth of penetration of this projectile to be small and which, furthermore does not break under impact of projectile.

The concrete according to the invention therefore enables to reach important impact, shock or projectile protection even when it is employed in the form of thin slabs, walls or partitions.

It may therefore be employed for providing coatings for protection against small size projectiles, such as bullets fired by firearms, or against large projectiles, such as bombs.

It may also serve for manufacturing personal or collective shelters, whether static or mobile, for the protection of banks, prisons and so-called vital industrial installations, against intrusions or attacks which could be committed, in particular using pick hammers or similar tools, or for coating objects which have to be transported and may be dropped while being transported.

It may furthermore be used in the nuclear field or for earthquake protection.

PREPARATION OF THE CONCRETE ACCORDING TO THE INVENTION

The concrete according to the invention may be prepared in the following manner:

constituents a), b), c), d) and f) are put into a mixer and mixed until the desired consistency is obtained, then fibres e) are added while continuing to mix, so that the fibres are dispersed as uniformly as possible, next, the mix obtained is casted into a mould which is vibrated, after 2 to 10 minutes, vibration is stopped and the mould and its mix are left to stand for about 24 hours, the concrete is then removed from the mould and preferably left to stand for at least one day, advantageously in a humid atmosphere (moisture content greater than about 65% relative humidity), after which, the concrete is preferably subjected to an heat treatment under controlled atmosphere at a temperature of between about 80° C. and about 600° C., preferably between about 110° C. and about 350° C., until it is dry, which means for those skilled in the art that it has a free-water content of generally less than 0.2% as a percentage by weight with respect to the concrete.

EXAMPLES

Concretes were prepared by the process described above using the compositions indicated in Table A below, in which:

composition A1 corresponds to Example No. 9 of French Patent Application No. 2,633,922, and composition A2 corresponds to Example No. 3 of French Patent Application No. 2,640,962.

TABLE A

| | CONCRETES TESTED | | | | | |
|---|---|---|---|---|---|---|
| Constituents | Example 1 | Example 2 | Example 3 | Example 4 | A1 | A2 |
| Particles (A) and their size | 81% tabular-form alumina 0.01 to 5 mm | 50.6% of ALAG ® 0.5 to 5 mm, 32.8% of brown corundum 0.01 to 0.5 mm | 80% of brown corundum 0.01 to 5 mm | 86% of brown corundum, 0.01 to 5 mm | 35.5% of 0/6 diorite 49.3% of 6/10 diorite | 50.0% of fine grit, 300–1000 mm 6.4% of C 600 quartz 8.4% of C 400 quartz |
| Particles (B) and their size | 5% of silica fume 100 Å to 1 μm | 5.9% of silica fume 100 Å to 1 μm | 3.5% of silica fume 100 Å to 1 μm | 5% of silica fume 100 Å to μm | 1.4% of silica fume | 3.5% of microsilica |
| Particles (C) and their size | 10% of fine alumina 1 to 10 μm | 5.9% of fine alumina 1 to 10 μm | — | 5% of fine alumina, 1 to 10 μm | — | — |
| Cement | 4% of alumina cement | 4.8% of alumina cement | 16.5% of CPA 55 | 4% of alumina cement | 13.8% of HP cement | 31.7% of CPA 55 |
| Dispersing agent(s)[1] | 0.08% of TPP 0.03% of PNS | 0.09% of TPP 0.035% of PNS | 0.35% of PNS | 0.08% of TPP 0.03% of PNS | 0.28% of Sikafluid | 1.4% |
| Admixture[2] | 0.01% of citric acid | 0.01% of citric acid | — | 0.01% of citric acid | — | 0.03% of anti-foam agent |
| Fibres and type[3] | 80 kg/m³, i.e. 2.5% steel | 80 kg/m³, i.e. 2.5% steel | 80 kg/m³, i.e. 2.5% steel | 80 kg/m³, i.e. 2.5%, steel | 80 kg/m³, i.e. 3.2% cast iron | 11% metal |
| Water[4] | 3.6% | 3.2% | 3.5% | 3.6% | 3.9% | 9.2% |
| Rest period after demoulding | >1 day in a humid atmosphere | >1 day in a humid atmosphere | >1 day in a humid atmosphere | >1 day in a humid atmosphere | — | >1 day in a humid atmosphere |
| Heat treatment | At 280° C. | At 280° C. | At 280° C. | At 280° C. | — (compacted) | At 200° C. |

[1]TPP: sodium tripolyphosphate sold by the Rhône-Poulenc company
PNS: sodium polynaphthalene sulphonate sold by the C.F.P.I. company under the name "GALORYL PA 120"
[2]The weight percentage of admixture was calculated with respect to the weight of particles (A), (B), (C), of cement and of dispersing agent.
[3]The fibres used were straight smooth steel fibres having a length of about 17 mm and a diameter of about 0.2 mm sold by the Tréfileries de Conflandey company.
[4]The percentage of water was also calculated with respect to the weight of particles (A), (B), (C), of cement and of dispersing agent.

The mechanical properties of the concretes according to the invention were measured on test pieces (64×54×230 mm) after heat treatment under controlled atmosphere during 48 hours. The results are collated in Table B below in which the following are also given:

the mechanical properties of concretes A1 and A2, as indicated in French Patent Applications Nos. 2,633,922 and 2,640,962, respectively, as well as the results of the penetration resistance tests on the concretes according to the invention.

The measurements of the compression strength and flexural strength of the concretes according to the invention were carried out according to the European Recommendation No. PRE R27.

The measurements of porosity of the concretes according to the invention were carried out according to the NF B40.321 standard.

The penetration resistance tests were carried out on slabs made of concrete according to the invention used as targets with dimensions of about 40×40×10 cm. The projectiles were ordinary 12.7 mm-diameter bullets weighing about 46 g, fired using a 12.7-calibre machine gun. The distance separating the end of the 12.7-calibre gun from the targets was such that the bullets reached the targets with a velocity of the order of 830 m/s.

Next, the depth of penetration was measured on the targets which had withstood the impact of the projectile, by inserting a gauge into the imprint left by the projectile after recochet on surface of the concrete.

in Table C below. The characteristics (mechanical properties and porosity) are given in Table D.

TABLE C

| | CONCRETES TESTED | |
|---|---|---|
| Constituents | Example 5 | Ordinary concrete |
| Particles (A) and their size | 86% of brown corundum, 0.01 to 10 mm | 32% of 10/20 mm gravel 14% of 5/10 mm gravel 38% of 0/5 mm sand |
| Particles (B) and their size | 5% of silica fume, 100 Å to 1 μm | — |
| Particles (C) and their size | 5% of fine alumina, 1 to 10 μm | — |
| Cement | 4% of alumina cement | 15% of CPA 55 |
| Dispersing agents(s)[1] | 0.08% of TPP 003% of PNS | 1% of PMS |
| Admixture | 0.01% of citric acid | — |
| Fibres and type[2] | 80 kg/m³, i.e. 2.5% steel | — |
| Water[2] | 3.6% | 7.5% |
| Heat treatment | At 280° C. | — |
| Rest period | >1 day in a humid atmosphere | — |

[1]TPP and PNS: as in Table A
PMS: polymelamine sulphonate sold under the name "Resin GT" by the Chryso company
[2]As in Table A

TABLE B

| RESULTS | Example 1 | Example 2 | Example 3 | Example 4 | A1 | A2 |
|---|---|---|---|---|---|---|
| Compression strength, in MPa | 170 | 230 | 180 | 150 | — | 205 |
| Flexural strength, in MPa | 26 | 26 | 22 | 18 | 13.2 | 30.8 |
| Porosity, in % | 12 | 9 | 10 | 14 | — | — |
| Depth of penetration of the projectile | 12 mm | [1]60 mm with cracking in concrete not heat-treated and 19 mm without cracking in heat-treated concrete | 25 mm | [2]40 mm in concrete heat-treated at 80° C. and 17 mm in concrete heat-treated at 280° C. | — | — |

[1]The tests were carried out both on concrete heat-treated under controlled atmosphere at 280° C. and on concrete not heat-treated
[2]The tests were carried out both on concrete heat-treated under controlled atmosphere at 80° C. and on concrete heat-treated at 280° C. under controlled atmosphere It is surprising to note that the concretes of Examples 1 to 3 have a flexural strength almost twice as high as that of concrete A1 which is, however a compacted concrete.

Furthermore, flexural strength of the concrete of Example 3 is barely 28.6% less than that of concrete A2, although concrete A2 has a cement content almost twice as high, a fibres content four times greater and particles (A) having a greater hardness than that of particles (A) of the concrete of Example 3.

With regard to the projectile penetration resistance, it was established that all the projectiles were stopped by the concretes according to the invention and that targets remained in one piece and did not crack.

The heat-treated under controlled atmosphere concretes show a greater penetration resistance than the non-heat-treated concretes.

In addition, penetration resistance tests carried out using 12.7 mm-calibre piercing-tip (PPI) bullets have shown that the concretes of Examples 1 and 4 stop this type of projectile. This is surprising when it is recalled that these same projectiles will pierce a 27 mm layer of armour steel.

Other tests were carried out using several kinds of projectiles. The compositions of the concretes tested are given

TABLE D

| CHARACTERISTICS | Example 5 | Ordinary concrete |
|---|---|---|
| Compression strength, in MPa | 150 | 45 |
| Flexural strength, in MPa | 18 | — |
| Porosity in % | 14 | — |

OTHER TESTS a) 1:5 scale 1000-pound bombs:

The targets were blocks having a size of 1×1.25×1 m, composed of a first 20 cm-thick layer of concrete according to Example 5 in contact with a second 80 cm-thick layer of ordinary concrete.

The projectiles reached the targets (the first layer) with a velocity of about 270 m/s.

The depth of penetration of the projectiles remained less than 30 mm. The projectiles were virtually broken up by impact and no cracking of the targets was observed.

b) 1:2 scale 1000-pound bombs:

The targets were blocks having a size of 2×2×1.2 m, composed of a first 50 cm-thick layer of concrete according to Example 5 in contact with a second 70 cm-thick layer of ordinary concrete.

The projectiles reached the targets (the first layer) with a velocity of about 280 m/s.

The depth of penetration of the projectiles remained less than 40 cm.

During one test carried out under the same conditions using a slab consisting entirely of ordinary concrete, the depth of penetration of the projectiles was about 90 cm.

c) 14.5 mm-calibre API projectiles

The targets were slabs made of the concrete of Example 5, having a size of 2×3×0.2 m the rear face of which was covered with a 10 mm-thick reinforcing plate of mild steel.

The projectiles reached the targets with a velocity of about 980 m/s.

The depth of penetration of the projectiles remained less than 100 mm. After firing 7 times in succession at the same slab, aiming at the same impact point, the depth of penetration was still less than 160 mm.

Clearly, the invention is in no way limited by the particular features which have been specified in the foregoing or by the details of the examples chosen to illustrate it. Many modifications may be made to the particular embodiments and to the examples which have been described by way of illustration and to their constituent components without thereby departing from the scope of the invention. The latter consequently encompasses all means that are technical equivalents of the means described, as well as the combination thereof.

We claim:

1. An impact resistant concrete composition containing an admixture of a hydraulic binder, aggregates, and fibers, said composition comprising:
    a) from 70 to 86% of particles (A) having a particle size distribution which ranges from a minimum size of 0.01 mm up to a maximum size of 3–50 mm,
    b) from 2 to 10% of particles (B) having a particle size of between 0.01 and 1 µm,
    c) from 3 to 20% of hydraulic binder,
    d) from 0.1 to 3% of a dispersant or of a plasticizer,
    e) from 0.05 to 8.5% of fibers, and
    f) mixing water, the percentage of all being percentages by weight relative to the sum of the weights of constituents a) to d).

2. The concrete composition according to claim 1, wherein the particles (A) are aggregates having a hardness greater than 5 Mohs.

3. The concrete composition- according to claim 2, wherein the particles (A) are selected from the group consisting of tabular-form alumina, electrofused corundum, natural or calcined bauxite, alumina-based materials, granite, quartzite, diabase, basalt, crystalline quartz, silicon carbides, silicon nitrides, boron carbides, titanium carbides, metals, metal alloys and mixtures thereof.

4. The concrete composition according to claim 1, wherein the particles (B) are selected from the group consisting of fly ashes and ultra-fine fillers selected from the group consisting of ultra-fine silica fume, ultra-fine microsilicas, ultra-fine kaolinites, ultra-fine calcined clays, ultra-fine limestone fines, ultra-fine chromium oxide, ultra-fine titanium oxide, ultra-fine zirconium oxide, ultra-fine aluminum oxide, and mixtures thereof.

5. The concrete composition according to claim 1, wherein the hydraulic binder is selected from a group consisting of: an alumina cement, a mixture of alumina cements, Portland cement, a vitreous cement, a mixture of vitreous cements, a mixture of at least one alumina cement with at least one Portland cement, a mixture of at least one vitreous cement with at least one Portland cement, a cement containing slag, a cement containing pozzolanes and a mixture thereof.

6. The concrete composition according to claim 5, wherein when the hydraulic binder is a Portland cement, its content is between about 10 and 20%, and when the hydraulic binder is an alumina cement or a vitreous cement, its content is between 3 and about 10%.

7. The concrete composition according to claim 1, wherein the fibers are metal fibers, mineral fibers, glass fibers, carbon fibers, plastic material fibers or a mixture of these fibers.

8. The concrete composition according to claim 7, wherein the fibers are metal fibers.

9. The concrete composition according to claim 1, wherein the fiber content is between 0.05 and 5%.

10. The concrete composition according to claim 1, wherein it further comprises: particles (C) having, a particle size of between 1 and 10 µm.

11. The concrete composition according to claim 10 wherein the particles (C) content is legs than 12% by weight with respect to the sum of the weights of constituent a) to d) and of the weight of said particles (C), the percentage of fibers then being calculated by weight with respect to the sum of the weights of constituents a) to d) and of the weight of said particles (C).

12. The concrete composition according to claim 10, wherein particles (C) are selected from the group consisting of tabular-form alumina, electrofused corundum, natural or calcined bauxite, alumina-based materials, granite, limestones, quartzite, diabase, basalt, ground crystalline quartz, silicon carbides, silicon nitrides, boron carbides, titanium carbides, metals, metal alloys and mixtures thereof.

13. The concrete composition according to claim 10, wherein the composition further comprises one or more additional components selected from the group consisting of anti-foam agents, water-proofing agents, air entrainers, set-accelerators, set-retarder, colorants and mixtures thereof.

14. The concrete composition according to claim 1, wherein the mixing water is present in an amount between 2 to 5% by weight relative to the sum of the weights of constituents a) to d) of the concrete composition.

15. A method for preparing an impact resistant concrete composition, which contains an admixture of a hydraulic binder, aggregates, and metal fibers, said composition comprising:
    a) from 70 to 86% of particles (A) having a particle size distribution which ranges from 0.01–3 mm to 0.01–50 mm,
    b) from 2 to 10% of particles (B) having particle size of between 0.01 and 1 µm,
    c) from 0 to 12% of particles (C), wherein the majority of the particles are of the size between 1 and 10 µm,
    d) from 3 to 20% of hydraulic binder,
    e) from 0.1 to 3% of a dispersant or of a plasticizer,
    f) from 0.05 to 8.5% of fibers, and
    g) from 2 to 5% of water, the percentage of all being percentages by weight relative to the sum of the weights of constituents a) to e), the method comprising the steps of: mixing the particles (A), the particles (B), the particles (C), the hydraulic binder, the dispersant or plasticizer, and the water to form a mix; adding and uniformly dispersing the fibers in the mix; and, casting the mix into a mold.

16. The method according to claim 15, wherein the composition is subjected to setting and hardening.

17. The method according to claim 15, wherein the concrete composition is subjected to heat treatment under controlled atmosphere.

18. The method according to claim 15, wherein the heat treatment under controlled atmosphere is carried out at a temperature of between 80° C. and 600° C.

19. A method for using a shield against impacts or shocks which comprises providing the shield with a concrete composition according to claim 1, wherein the composition forms a wall that resists fracture or shattering from impacts or shocks.

20. A method for using a protection shielding against projectiles which comprises providing a concrete composition according to claim 1, wherein the composition forms at least part of the shielding to slow and stop the penetration of the projectiles.

21. A method for using a protection shielding against projectiles according to claim 20, wherein the projectiles include projectiles fired by a 12.7-caliber machine gun, 14.5 mm projectiles, 1:5 scale 1000-pound bombs, or 1:2 scale 1000-pound bombs.

22. A method for using a shield against impacts or shocks which comprises providing the shield with a concrete composition according to claim 1, wherein the composition forms plates or slabs having a reinforcing plate on their rear face.

23. The method according to claim 15, wherein the heat treatment under controlled atmosphere is carried out at a temperature of between 110° C. and 350° C.

24. The concrete composition according to claim 13, wherein the content of the additional components is less than 1% by weight with respect to the sum of the weights of constituents a) to d) of the concrete plus the weight of particles (C).

25. The method according to claim 15, wherein composition has a compressive strength of 150–230 MPa.

* * * * *